May 5, 1936.  R. H. McKEE  2,039,330
PURIFICATION OF CARBON DIOXIDE
Filed July 8, 1930
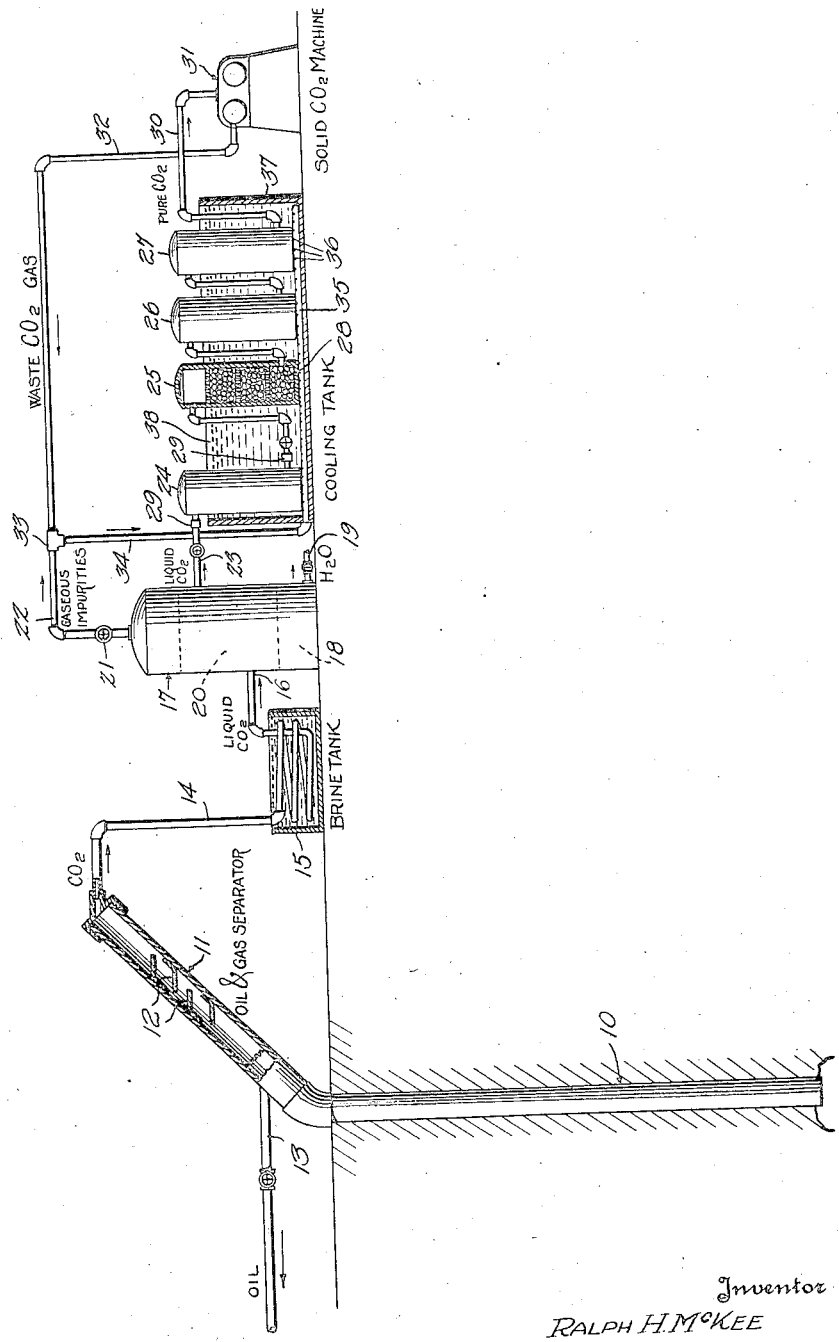
Inventor
RALPH H. McKEE
By
C. L. Parker Jr.
Attorney Patented May 5, 1936

2,039,330

UNITED STATES PATENT OFFICE 2,039,330

PURIFICATION OF CARBON DIOXIDE

Ralph H. McKee, Jersey City, N. J.

Application July 8, 1930, Serial No. 466,546

7 Claims. (Cl. 23—150)

This invention relates to the purification of carbon dioxide and more particularly to a process of preparing liquid or solid carbon dioxide which, when allowed to evaporate, will be free from unpleasant odor.

The principal object of this invention is to provide a simple, efficient and commercially practical process of purifying and deodorizing impure carbon dioxide.

An important object of this invention is to provide an effective process of removing from impure carbon dioxide odorous impurities and particularly odorous low-boiling hydrocarbons.

Another object of this invention is to provide a simple and economical process of preparing substantially pure carbon dioxide from impure carbon dioxide discharged from natural gas and oil wells.

Other objects and advantages of the invention will become apparent during the course of the following description.

In certain of the industries where carbon dioxide is employed it is important that the carbon dioxide be substantially free from unpleasant odor and in numerous other industries it is desirable that this material be free from objectionable odors. For example, it is a practical necessity that the carbon dioxide used in carbonating beverages shall not contain impurities which will impart to the beverages an undesirable flavor or odor. Similarly, the carbon dioxide used in refrigerating machines should be free from impurities which have a corrosive action on the machinery and should not contain odorous impurities. Similarly, it is quite important that the carbon dioxide in solid form which is now coming into use widely as a refrigerant should not be objectionably odorous or yield odorous gases upon evaporation. Thus, it is apparent that there is at the present time a great demand for carbon dioxide which is not objectionably odorous.

To a large extent, the carbon dioxide used in the industries where a relatively pure product is desired has been obtained by fermentation methods so that the impurities present are largely oxygen compounds such as aldehydes, alcohols, esters and the like. These oxygen compounds have, to a certain measure, been removed by scrubbing the gas with water and contacting it at normal pressures with an absorbent such as cocoanut shell carbon. This source and treatment of carbon dioxide has been generally satisfactory but has been relatively expensive.

A considerably cheaper source of carbon dioxide is found in gases from certain natural gas wells where the proportion of carbon dioxide is ordinarily more than 50 per cent. Also, carbon dioxide is widely obtained from coal and coke gases. However, the product obtained from these latter sources has been found to be objectionable in many industries because of the unpleasant odor of the material resulting from the presence of low-boiling hydrocarbons, principally propane, butane, pentane, and hexane and, to a less extent, lighter hydrocarbons such as ethane and methane. Accordingly, the use of such carbon dioxide has been limited. In addition, there has been a certain limitation of the use of liquid and solid carbon dioxide prepared according to certain processes due to the cracking of the lubricating oil used in the compressor. Due to this cracking the carbon dioxide prepared contains small amounts of the low-boiling hydrocarbons mentioned above and also unsaturated hydrocarbons such as ethylene, propylene, butylene and other odorous constituents. While these materials have not been present in great amounts the product has been found to be objectionable, primarily due to the particularly odorous character of the unsaturated hydrocarbons mentioned. It is found that very small amounts of these materials will impart a decidedly unpleasant odor to the final product.

It is the principal purpose of this invention to provide for the removal from carbon dioxide of organic compounds of the character referred to above in a simple and effective manner.

In its broad aspects, my invention consists of contacting impure carbon dioxide having a density of approximately from 3 to 60 pounds per cubic foot with an absorbent capable of removing from the dense product low-boiling hydrocarbons of the character referred to above. I prefer to treat the carbon dioxide in liquid condition and to employ an absorbent carbon to remove the odorous impurities. An activated carbon of the ordinary gas adsorbent type made from cocoanut charcoal such as was used in gas masks during the World War or an adsorbent carbon made in accordance with my Patent No. 1,133,049, issued March 23, 1915, may advantageously be used as the absorbent material. However the invention is not limited to the use of an activated carbon. For example, silica gel may be used with some measure of success. Similarly, under some circumstances solid paraffin in granular form may be used with excellent success. Another type of absorbent would be a heavy odorless oil such as refined white petroleum oil.

In a more specific aspect, my invention contemplates cooling a gas mixture containing a major proportion, i. e., over 50 per cent., of carbon dioxide, and preferably about 95 per cent. carbon dioxide, under a pressure of from 400 to 1000 pounds per square inch to such an extent that the density of the impure carbon dioxide will be from approximately 5 to 60 pounds per cubic foot and contacting the resulting material with a gas absorbent of the above referred to character, after which the purified carbon dioxide may be converted into solid carbon dioxide if desired. In preferred practice, the impure gas is compressed to approximately 900 pounds per square inch in order that it may be liquefied and contacted in liquid condition with the absorbing material for the low-boiling hydrocarbons present.

A particularly advantageous application of my invention is found in employing the process to purify natural gas from certain wells where the gas is high in carbon dioxide content and is delivered under a pressure of approximately from 500 to 1000 pounds per square inch. For example, in Mexico near Tampico, there are wells which discharge natural gas together with petroleum oil under pressure of approximately 1000 pounds per square inch. In Colorado there are wells which yield natural gas containing large amounts of carbon dioxide and produce no liquid petroleum.

As will be apparent, by practicing this invention in the vicinity of high pressure wells of the character mentioned, the necessary high pressure is available in addition to an ample supply of carbon dioxide and it will be obvious that the invention may be particularly advantageously practiced in such locations. Of course, in certain of the wells yielding a gas of high carbon dioxide content the pressure may be below the minimum limit mentioned above and it will be necessary to employ additional compression to secure the desired degree of pressure.

In the accompanying drawing I have shown in diagrammatic form one form of apparatus suitable for use in the practice of my process in conjunction with a high pressure well of the above referred to character. In the interest of describing a specific embodiment of my invention the following procedure adapted for use in conjunction with a pressure well may be considered as illustrative of the invention. However, it will be apparent that the invention is not limited for use in conjunction with a high pressure natural gas well but may be used to treat impure carbon dioxide from other sources by employing a compressor to secure the desired degree of pressure.

Referring to the accompanying drawing, the numeral 10 designates generally a well from which natural gas containing a major proportion of carbon dioxide is discharged under a pressure of from 400 to 1000 pounds per square inch. Since natural gas generally contains a greater or less amount of liquid petroleum it is desirable to discharge the natural gas into an oil and gas separator which is indicated on the drawing by reference numeral 11. This separator may be of any conventional construction. In the form shown in the drawing the oil is separated from the gas by means of the baffles 12 and is withdrawn from the separator through the pipe 13. The gas from this separator is passed in the pipe 14 through a brine tank 15 where it is cooled, preferably to liquefied condition. As the gas in the pipe 14 is under high pressure, approximately its critical pressure, its latent heat will be approximately zero and accordingly the amount of cooling required is small.

The crude liquefied carbon dioxide is conveyed through the pipe 16 into a suitable container 17 where the products of the mixture will separate into layers, a layer of condensed moisture originally present in the gas settling to the bottom of the tank as indicated at 18 and being withdrawn through the pipe 19. A layer of liquid carbon dioxide will form as at 20 above the layer of condensed moisture and from the top of the container permanent gases such as nitrogen, oxygen, methane and the like, and unliquefied carbon dioxide, are bled off by means of the valve 21 through the pipe 22.

The liquid carbon dioxide is drawn off through the pipe 23 and passed through a series of containers 24, 25, 26 and 27, containing a gas absorbent, preferably granulated activated carbon, indicated by the reference numeral 28. In the preferred embodiment of apparatus the cylinder or container 24 is made readily removable by means of the detachable couplings 29 in order that this container, which has the principal burden in removing the odorous materials, may easily be replaced by a similar container while the removed container is being treated to reactivate or revivify the absorbent therein as by means of heat or steam to drive off the absorbed impurities. From time to time the containers 25, 26 and 27 may be replaced with similar containers containing fresh absorbent or the absorbent material may be removed therefrom and fresh material added or a container may be simply disconnected and left in place while the contents are revivified, the other containers operating meanwhile.

The purified liquefied carbon dioxide is discharged from the cylinder or container 27 through the pipe 30 through which it may be delivered to liquid carbon dioxide cylinders (not shown) or a solid carbon dioxide machine indicated in the drawing by the reference numeral 31. The waste carbon dioxide gas which is not solidified in the solid carbon dioxide machine 31 is discharged therefrom through the pipe 32 which connects with the pipe 22 at the union 33 and the pipes 22 and 32 continue from the union 33 in a single pipe 34 which communicates with a pipe 35 having a plurality of openings 36 therein, which is arranged in the lower portion of a tank 37 containing a body of fresh water 38. Alternatively, the pipe 32 may be connected to the inlet of a gas compressor and its gas reliquefied.

The purpose of the cooling tank 37 is to chill the absorbing containers 24, 25, 26 and 27 arranged therein. These containers may be cooled in any other manner as by spraying cold water on the containers or providing the containers with jackets through which cold water is circulated. However, the arrangement of apparatus shown is particularly advantageous in connection with the present invention since it has been found that by discharging the gaseous impurities from the container 17 and the waste carbon dioxide from the solid carbon dioxide machine 31 into the body of fresh water 38 through the openings 36 in the pipe 35 and permitting these gases to bubble therefrom, the water is kept at the desired low temperature. Unlike ordinary air, the gas discharged from the pipe 35 through the openings 36 is substantially free from water, that is, it is approximately perfectly dry, and accordingly in bubbling through the body of fresh water 38 it will not only cool the water due to the low temperature of the gas but also due to the low temperature produced by the expanding of the gas through the openings 36, and even more so due to the amount of water which will be evaporated away from the contents of the tank. If the tank is filled with plain water rather than with brine of any kind, the gases bubbled therethrough will reduce the water to approximately its freezing point in a relatively short time. For example, if for a certain volume of water at 80° F. this dry gas is bubbled through at a given rate, it will reduce the temperature of the water to 50° F. in approximately 20 minutes. However, if brine were used, it would require passing the same amount of gas through the water for approximately 70 minutes to reduce the temperature to 50° F., and if the gas were merely passed through the tank in a cooling pipe, it would require several hours to effect the same degree of cooling. The reason that the brine requires a longer treatment than in the case of fresh water is that there is less evaporation from brine than from water and the cooling will be essentially proportionate to the water evaporated from the tank by the dry gas bubbling through it.

While in the preferred practice of my process the odorous low-boiling hydrocarbons are removed from the carbon dioxide while the latter is in liquid condition it is to be understood, as explained in detail above, that the carbon dioxide may be treated in gaseous condition providing that the density of the gas is at least approximately 3 pounds per cubic foot. However, it will be found particularly advantageous to treat the carbon dioxide in liquid condition since smaller apparatus may be used and the operation conducted at room temperature or slightly below.

By the term "gas absorbent" as employed in certain of the claims is meant a material capable of removing low-boiling hydrocarbons of the character referred to above from impure carbon dioxide containing the same when the latter possesses a density of from 3 to 60 pounds per cubic foot. The term is intended to cover activated carbon, silica gel, granulated solid paraffin, heavy odorless oils and the like.

While I have described in detail the preferred practice of my process and a preferred form of apparatus with which it is to be used, it is to be understood that the form of apparatus and the details of procedure of the process may be widely varied without departing from the spirit of the invention or the scope of the subjoined claims.

I claim:

1. A process of the character described for removing odorous impurities from carbon dioxide which comprises contacting the impure carbon dioxide in liquid form with a gas absorbent selected from the group consisting of activated carbon, paraffine and heavy oil.

2. A process of the character described for removing odorous impurities from carbon dioxide which comprises contacting the impure carbon dioxide in liquid form with activated carbon.

3. A process of the character described for removing low-boiling hydrocarbons from carbon dioxide containing the same which comprises cooling such carbon dioxide under a pressure of approximately 900 pounds per square inch to liquefy the carbon dioxide, and contacting the same with a gas absorbent selected from the group consisting of activated carbon, paraffine and heavy oil.

4. A process of the character described for removing low-boiling hydrocarbons from carbon dioxide containing the same which comprises cooling such carbon dioxide under a pressure of approximately 900 pounds per square inch to liquefy the carbon dioxide, and contacting the same with activated carbon.

5. A process of the character described for preparing substantially non-odorous carbon dioxide from natural gas containing a major proportion of carbon dioxide which comprises cooling such natural gas under pressure to liquefy carbon dioxide present, and contacting the liquid carbon dioxide with a gas absorbent selected from the group consisting of activated carbon, paraffine and heavy oil.

6. A process of the character described for preparing substantially non-odorous carbon dioxide from natural gas containing a major proportion of carbon dioxide which comprises cooling such natural gas under pressure to liquefy carbon dioxide present, and contacting the liquid carbon dioxide with activated carbon.

7. A process of the character described for preparing substantially non-odorous carbon dioxide from natural gas containing a major proportion of carbon dioxide which comprises cooling such natural gas under pressure to liquefy carbon dioxide present, separating the liquid carbon dioxide from the water and unliquefied gases present, contacting the liquid carbon dioxide with a gas absorbent selected from the group consisting of activated carbon, paraffine and heavy oil, and maintaining the liquid carbon dioxide cold during such contact by means of water cooled by bubbling said unliquefied gases therethrough.

RALPH H. McKEE.